United States Patent
Amendola et al.

(10) Patent No.: US 8,243,552 B2
(45) Date of Patent: Aug. 14, 2012

(54) ULTRASOUND EMISSION DERATIZATION METHOD AND DEVICE

(75) Inventors: Carlo Amendola, Siracusa (IT); Giovanni Zacco, Floridia (IT); Gianfranco Cocozza, Milan (IT)

(73) Assignee: Hi. Tech Innovation S.R.L., Siracusa (IT)

( * ) Notice: Subject to any disclaimer, the term of this patent is extended or adjusted under 35 U.S.C. 154(b) by 332 days.

(21) Appl. No.: 12/305,606

(22) PCT Filed: Jun. 19, 2007

(86) PCT No.: PCT/EP2007/005383
§ 371 (c)(1), (2), (4) Date: Dec. 18, 2008

(87) PCT Pub. No.: WO2007/147558
PCT Pub. Date: Dec. 27, 2007

(65) Prior Publication Data
US 2009/0175129 A1 Jul. 9, 2009

(30) Foreign Application Priority Data
Jun. 19, 2006 (IT) .................. MI06A1170

(51) Int. Cl.
*G08B 3/10* (2006.01)
*H04B 11/00* (2006.01)
(52) U.S. Cl. ..................................... 367/139; 340/384.2
(58) Field of Classification Search .................. 367/139; 340/573.2, 384.2; 116/22 A
See application file for complete search history.

(56) References Cited

U.S. PATENT DOCUMENTS

| | | | | |
|---|---|---|---|---|
| 3,636,559 A | * | 1/1972 | Del Grande et al. | 340/384.2 |
| 3,838,418 A | * | 9/1974 | Brown | 367/139 |
| 3,872,472 A | * | 3/1975 | Moschgat | 340/384.2 |
| 3,879,702 A | * | 4/1975 | Mancone | 367/139 |
| 3,893,106 A | * | 7/1975 | Schulein | 340/384.2 |
| 4,001,817 A | * | 1/1977 | Squires | 340/384.2 |
| 4,186,387 A | * | 1/1980 | Moschgat | 367/139 |
| 4,484,315 A | * | 11/1984 | Hall | 367/139 |
| 5,598,379 A | | 1/1997 | Malleolo | |

FOREIGN PATENT DOCUMENTS

| | | |
|---|---|---|
| AU | 636612 B2 | 5/1993 |
| EP | 0664079 A1 | 7/1995 |
| FR | 2775160 A1 | 8/1999 |

OTHER PUBLICATIONS

International Search Report for International Application No. PCT/EP2007/005383 filed Aug. 10, 2007 (3 pages).
Written Opinion of the International Searching Authority for International Application No. PCT/EP2007/005383 filed Aug. 10, 2007 (5 pages).
Notification of Transmittal of the International Preliminary Report on Patentability for International Application No. PCT/EP2007/005383 filed Aug. 10, 2007 (8 pages).

* cited by examiner

*Primary Examiner* — Ian Lobo
(74) *Attorney, Agent, or Firm* — McCormick, Paulding & Huber LLP

(57) ABSTRACT

An ultrasound emission deratization device is described, comprising generation means (A, B, D) of a first ultrasound frequency (P1) and a second ultrasound frequency (P2) which are alternated, with a predetermined mean emission time for each of the two, and randomly variable time range pauses between a minimum and a maximum between one and the other.

13 Claims, 1 Drawing Sheet

ULTRASOUND EMISSION DERATIZATION METHOD AND DEVICE

CROSS REFERENCE TO RELATED APPLICATIONS

This application is entitled to the benefit of and incorporates by reference essential subject matter disclosed in International Patent Application No. PCT/EP2007/005383 filed on Jun. 19, 2007 and Italian Application No. MI2006A001170 filed on Jun. 19, 2006.

FIELD OF THE INVENTION

The present invention relates to an ultrasound emission deratization method and device.

DESCRIPTION OF THE PRIOR ART

Deratization devices which are based on the emission of disturbance ultrasounds are already known. They are based on the principle of affecting a given part of the brain of mice or rats by means of the emission of ultrasounds, forcing them to escape or causing the paralysis of their muscular and motor system.

All these known devices are not particularly effective, above all because mice and rats are capable of activating endogenous ultrasound emission habituation mechanisms, such as to make these animals immune from this type of annoyance. They are further capable of genetically transmitting the habituation sense to their offspring, and therefore after a short, given time, in view of their particular prolificacy, said emissions become ineffective and the mice are no longer affected thereby, thus continuing to thrive undisturbed.

SUMMARY OF THE INVENTION

It is therefore the object of the present invention to overcome all the aforesaid drawbacks and to indicate an ultrasound emission deratization method and device, capable of not causing the activation of disturbance habituation mechanisms in mice or rats, and therefore such as to make the genetic transmission of the habituation sense equally impossible.

The principle on which the method object of the present invention is based is that of emitting two ultrasound frequencies which are alternated, with a predetermined mean emission time for each of the two, and randomly variable time range pauses between a minimum and a maximum between one and the other.

It is the specific object of the present invention to provide an ultrasound emission deratization method and a device, as described in greater detail in the claims, which form an integral part of the present description.

BRIEF DESCRIPTION OF THE DRAWINGS

Further objects and advantages of the present invention will be apparent from the following detailed description of an embodiment of the same and from the accompanying drawings exclusively provided by way of non-limitative explanation, in which.

DESCRIPTION OF THE PREFERRED EMBODIMENT

Figure 1:
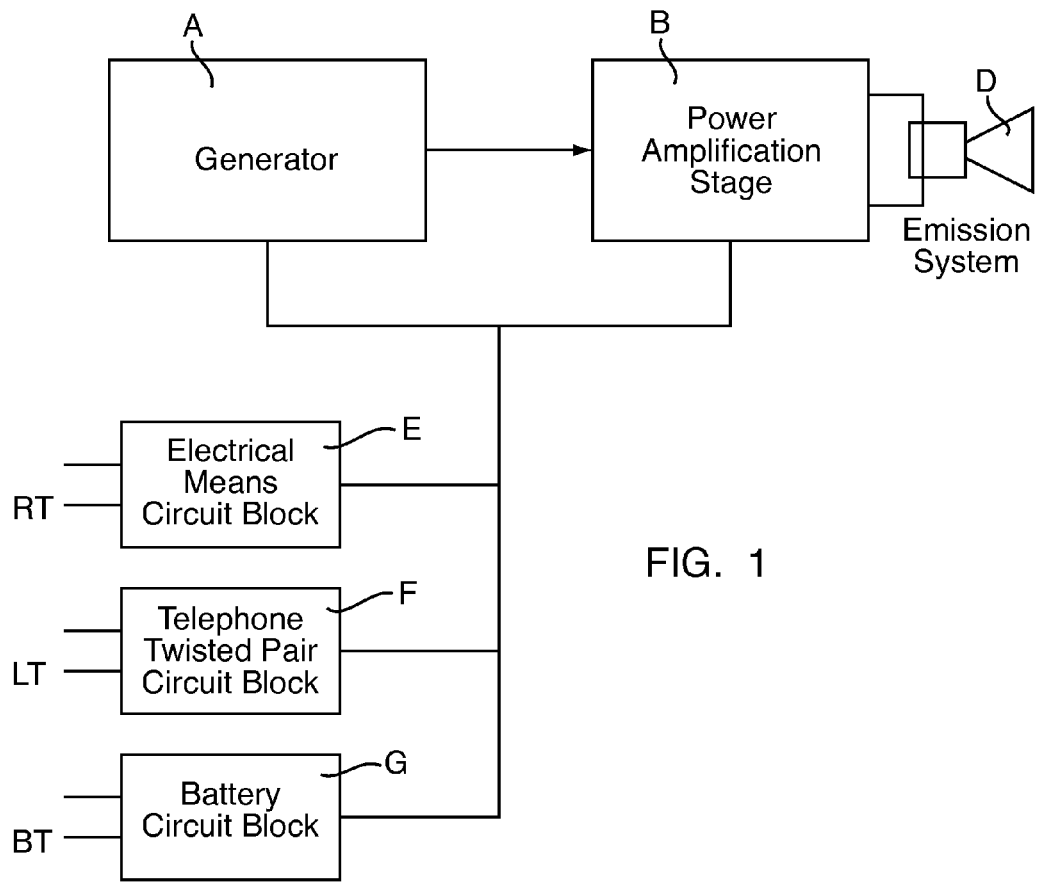
FIG. 1 indicates a block diagram of the device object of the present invention.

In FIG. 1, reference A indicates an ultrasound frequency generator based on a microprocessor unit. Reference B indicates a power amplification stage for the frequencies it receives from A. Reference D indicates an emission system comprising one or more ultrasound emission capsules fed by stage B.

Figure 2:
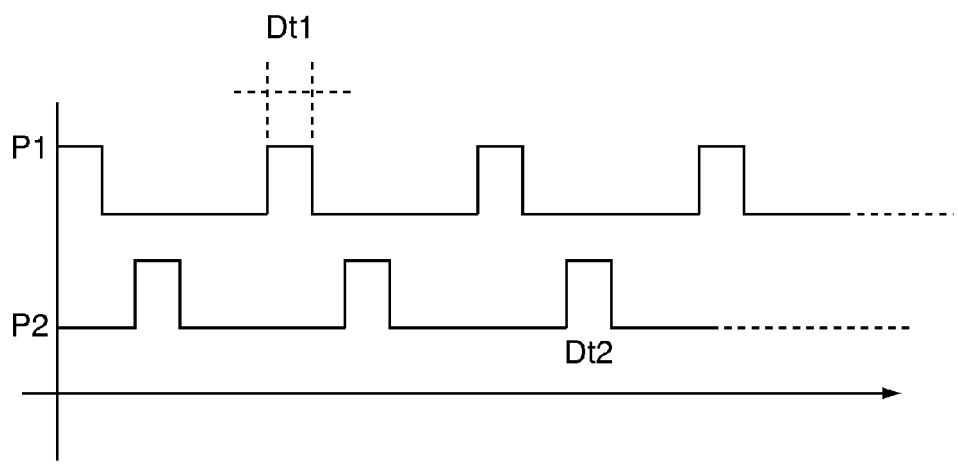
FIG. 2 depicts a diagram of the time trend of the ultrasound frequencies emitted by the device.

Generator A is capable of generating two signals having frequencies in the ultrasound range displaying the following features, also with reference to FIG. 2.

A first signal P1 consists of a series of pulses at a frequency selected from the range between 27 and 31 kHz.

The pulses have an ON time Dt1 of approximately $8.5 \times 10{-6}$ seconds.

A second signal P2 consists of a series of pulses at a frequency selected from the range between 39 and 43 kHz.

The pulses have an ON time Dt2 of approximately $6.1 \times 10{-6}$ seconds.

Advantageously, the frequency of the first signal may be selected from the range between 28 and 30 kHz, while the frequency of the second signal may be selected from the range between 40 to 42 kHz.

In a further advantageous variant, characteristic of the non-limitative embodiment described herein, the frequency of the first signal assumes a value of 29.40 kHz, while the frequency of the second signal assumes a value of 41 kHz The first and the second signal are alternatively generated for time periods having a given length, comprised between 2 and 10 seconds. Advantageously, said length may be approximately equal to 5 seconds.

After each emission, generator A makes a given pause time elapse, the duration of which randomly varies between two extremes which may vary between zero and 20 seconds.

Advantageously, the pauses may randomly vary between two extremes of 5 and 11 seconds.

The above-described circuit blocks may be fed either by electrical mains RT at 220V (block E), or by deriving electrical energy from telephone twisted pair LT (block F), on which a 50-55 V direct voltage is normally available, or by battery BT at 12-24 V (block G). Battery BT may be recharged by solar panels.

Variants of the described non-limitative example are possible, without because of this departing from the scope of protection of the present invention, comprising all equivalent implementations for a person skilled in the art.

The advantages deriving from the application of the present invention are apparent.

The ultrasound frequency generation method is such as not to cause the activation of disturbance habituation mechanisms in mice or rats, so that the genetic transmission of the habituation sense is not possible.

The device may be fed by different sources of electrical energy

From the description above, a person skilled in the art will be capable of implementing the object of the invention without introducing further constructive details.

While the present invention has been illustrated and described with respect to a particular embodiment thereof, it should be appreciated by those of ordinary skill in the art that various modifications to this invention may be made without departing from the spirit and scope of the present invention.

What is claimed is:

1. An ultrasound emission deratization method, comprising generating two ultrasound frequencies which are alternated, with a predetermined mean emission time for each of the two, and randomly variable time range pauses between a minimum and a maximum between one and the other, said two ultrasound frequencies comprising a first frequency with a value comprised in the range between 27 and 31 kHz, and a second frequency with a value comprised in the range between 39 and 43 kHz, wherein said mean emission time is comprised between 2 and 10 seconds and said pause emission time is randomly variable between 5 and 11 seconds.

2. An ultrasound emission deratization method according to claim 1, wherein said two frequencies have the trend of a sequence of pulses.

3. An ultrasound emission deratization device, comprising generation means of a first ultrasound frequency and a second ultrasound frequency which are alternated, with a predetermined mean emission time for each of the two, and randomly variable time range pauses between a minimum and a maximum between one and the other, said first frequency having a value comprised in the range between 27 and 31 kHz, and said second frequency having a value comprised in the range between 39 and 43 kHz, wherein said mean emission time is comprised between 2 and 10 seconds and said pause emission time is randomly variable between 5 and 11 seconds.

4. An ultrasound emission deratization device according to claim 3, wherein said first and second frequencies have the trend of a sequence of pulses.

5. An ultrasound emission deratization device according to claim 4, wherein said first frequency has a value comprised in the range between 28 and 30 kHz.

6. An ultrasound emission deratization device according to claim 4, wherein said first frequency has a value equal to 29.40 kHz.

7. An ultrasound emission deratization device according to claim 4, wherein said second frequency has a value comprised in the range between 40 and 42 kHz.

8. An ultrasound emission deratization device according to claim 4, wherein said second frequency has a value equal to 41 kHz.

9. An ultrasound emission deratization device according to claim 4, wherein said pulse sequence of the first frequency has an on time of approximately $8.5 \times 10^{-6}$ seconds.

10. An ultrasound emission deratization device according to claim 4, wherein said pulse sequence of the second frequency has an on time of approximately $6.1 \times 10^{-6}$ seconds.

11. An ultrasound emission deratization device according to claim 3, wherein said mean emission time is equal to 5 seconds.

12. An ultrasound emission deratization device according to claim 3, wherein said generation means of a first ultrasound frequency and a second ultrasound frequency comprise in cascade:
- an ultrasound frequency generator, based on a microprocessor unit;
- a power amplification stage for frequencies it receives from said ultrasound frequency generator; and
- an emission system comprising one or more ultrasound emission capsules fed by said power amplification stage.

13. An ultrasound emission deratization device according to claim 12, wherein said generation means are fed either by electrical mains at 220V, or by deriving electrical energy from a telephone twisted pair, or by battery, said battery being rechargeable by means of solar panels.

* * * * *